(12) United States Patent
Sun et al.

(10) Patent No.: US 11,707,895 B2
(45) Date of Patent: Jul. 25, 2023

(54) ZERO-POISSON-RATIO HONEYCOMB STRUCTURE AND INTERLOCKING ASSEMBLY MANUFACTURING METHOD THEREOF

(71) Applicant: Dalian University of Technology, Dalian (CN)

(72) Inventors: Shiyong Sun, Dalian (CN); Junlong Wang, Dalian (CN); Wen Zhang, Dalian (CN); Rui Yang, Dalian (CN); Wei Qian, Dalian (CN); Fei Gao, Dalian (CN)

(73) Assignee: Dalian University of Technology, Dalian (CN)

( * ) Notice: Subject to any disclaimer, the term of this patent is extended or adjusted under 35 U.S.C. 154(b) by 0 days.

(21) Appl. No.: 17/703,468

(22) Filed: Mar. 24, 2022

(65) Prior Publication Data
US 2022/0339892 A1    Oct. 27, 2022

(30) Foreign Application Priority Data
Apr. 22, 2021    (CN) .......................... 202110435324.8

(51) Int. Cl.
*B29L 31/60*      (2006.01)
*B29C 70/46*      (2006.01)
(Continued)

(52) U.S. Cl.
CPC .......... *B29C 70/46* (2013.01); *B29C 33/3835* (2013.01); *B29C 70/545* (2013.01); *B29L 2031/608* (2013.01)

(58) Field of Classification Search
None
See application file for complete search history.

(56) References Cited

U.S. PATENT DOCUMENTS

| | | | | |
|---|---|---|---|---|
| 3,501,367 A | * | 3/1970 | Parker | B21D 47/00 428/116 |
| 5,437,903 A | * | 8/1995 | Christensen | E04C 2/365 428/116 |
| 5,647,933 A | * | 7/1997 | Christensen | B31D 3/002 428/116 |

FOREIGN PATENT DOCUMENTS

WO    WO-2004026572 A1 *    4/2004    ......... B29D 99/0089

OTHER PUBLICATIONS

Tang et al., (Wave propagation in the polymer-filled star-shaped honeycomb periodic structure), Appl. Phys. A (2017) 123:523 )1-8). (Year: 2017).*

* cited by examiner

*Primary Examiner* — Elizabeth Collister
(74) *Attorney, Agent, or Firm* — Fish IP Law, LLP

(57) ABSTRACT

A zero-Poisson-ratio honeycomb structure and an interlocking assembly manufacturing method thereof are provided. The honeycomb structure is formed by combining a four-pointed star shaped structure and horizontal and vertical honeycomb wall arrays at star corners. The zero-Poisson-ratio honeycomb structure not only has the zero-Poisson-ratio characteristic, but also can achieve respective design of in-plane and out-of-plane mechanical properties. Meanwhile, due to the existence of the horizontal honeycomb walls and the vertical honeycomb walls, the connection of multiple honeycomb walls at angular points in the honeycomb structure is avoided. Moreover, a novel manufacturing mode is provided for the honeycomb structure in addition to prepare the honeycomb structure by utilizing a 3D printing process. The honeycomb structure can be manufactured by combining an interlocking assembly process with resin matrix composites. The performance of the honeycomb structure is further improved at the material level.

1 Claim, 5 Drawing Sheets

(51) Int. Cl.
*B29C 33/38* (2006.01)
*B29C 70/54* (2006.01)

ZERO-POISSON-RATIO HONEYCOMB STRUCTURE AND INTERLOCKING ASSEMBLY MANUFACTURING METHOD THEREOF

CROSS REFERENCE TO RELATED APPLICATION(S)

This patent application claims the benefit and priority of Chinese Patent Application No. 202110435324.8, filed on Apr. 22, 2021, the disclosure of which is incorporated by reference herein in its entirety as part of the present application.

TECHNICAL FIELD

The present disclosure belongs to the field of light structure design and manufacturing, and in particular relates to a zero-Poisson-ratio honeycomb structure and an interlocking assembly manufacturing method thereof.

BACKGROUND ART

As a typical bionic structure, the honeycomb structures are often made into sandwich structures as load-bearing or sub-load-bearing structures to be applied to the fields of aerospace and transportation due to high out-of-plane stiffness, lighter mass, and excellent designability of mechanical property thereof. According to different Poisson's ratio characteristics, the honeycomb structures can be divided into positive-Poisson-ratio honeycomb structures, zero-Poisson-ratio honeycomb structures, and negative-Poisson-ratio honeycomb structures. When subjected to uniaxial stretching or uniaxial compression, the zero-Poisson-ratio honeycomb structure does not change in the transverse direction. In addition, the saddle-shaped phenomenon occurring in the positive-Poisson-ratio honeycomb structure can be avoided during bending deformation. Thus the zero-Poisson-ratio honeycomb structure is particularly suitable for the needs for the flexible bearing of morphing wings. A certain amount of flexibility in the deformation direction and enough rigidity in the non-deformation direction can be met simultaneously. Hence, the zero-Poisson-ratio honeycomb structure can be used as a wing supporting structure and a flexible skin to be applied to the field of morphing aircrafts to achieve wing deformations such as variable span and variable chord.

Due to the particular and complex characteristics of most existing zero-Poisson-ratio honeycomb structures, the honeycomb structures such as various polymer plastic, metals and the like are always prepared and molded by adopting a 3D printing technology. However, there is a certain limitation in a resin matrix composite material honeycomb structure molded by the 3D printing technology. For the zero-Poisson-ratio honeycomb structure with a complex topological configuration, there are still certain defects in the continuous fiber reinforced composites prepared by adopting the 3D printing technology, thus high forming quality is difficult to guarantee. Therefore, a honeycomb structure with the zero-Poisson-ratio characteristic is provided in the present disclosure, the honeycomb structure can be manufactured by combining resin matrix composites with an interlocking assembly process. The performance of the honeycomb structure can be further improved at the material level.

SUMMARY

The present disclosure aims at providing a zero-Poisson-ratio honeycomb structure and an interlocking assembly manufacturing method thereof to meet the needs of a morphing wing for a supporting structure and a flexible skin. Moreover, the problems of matrix cracking and inability to achieve a lay up angle caused by the 3D printing process are solved for the continuous fiber reinforced composite.

To achieve the objective, a honeycomb structure is provided. The honeycomb structure not only has the zero-Poisson-ratio characteristic, but also can regulate and control the mechanical property of the whole structure by changing dimensional parameters of the structure. Meanwhile, due to the topological characteristics of the honeycomb structure, the preparation of resin matrix composites by using an interlocking assembly process is proposed to further enhance the structure performance at the material level in comparison with a 3D printing technology.

The technical solution of the present disclosure is as follows:

A zero-Poisson-ratio honeycomb structure is formed by an array of representative honeycomb structure unit cells in an X direction and a Y direction in the two-dimensional Cartesian coordinate system, thus guaranteeing that the shapes of the representative honeycomb structure unit cells are unchanged; and the step size of the array is the unit cell width, which is $2H+2L\cos\Phi$;

the representative honeycomb structure unit cell includes the following geometrical parameters: an inclined wall length L, a straight wall length H, honeycomb wall angles $\theta$ and $\Phi$, a honeycomb wall thickness t, and a unit cell thickness b;

the representative honeycomb structure unit cell is in a centrosymmetric pattern which is composed of a four-pointed star shape and straight walls; in an XOY plane, the four-pointed star has a side length of L, and an inner angle of $\theta$; and at the star corners of two adjacent four-pointed stars, the centrosymmetric pattern is formed by connecting the X-direction and Y-direction straight walls with the length of H; the zero-Poisson-ratio honeycomb structure is formed by stretching the centrosymmetric pattern with a distance b along the Z direction.

A zero-Poisson-ratio honeycomb structure is obtained by adopting an interlocking assembly manufacturing method, with the steps as follows:

the process of preparing the honeycomb structure by adopting the interlocking assembly process can be generally divided into two stages: the first is the preparation of honeycomb plates by using resin matrix composites molding process. The second is the procedures of cutting, interlocking and assembling the honeycomb plates.

The resin matrix composites molding is conducted in the first stage. The lay up design of the composites can be achieved in this stage. The molding process thereof has a significant influence on the structure performance. The common molding processes for the resin matrix composites include: a contact molding process (hand lay up molding process), a pultrusion molding process, a compression molding process, an RTM molding process, and the like.

In order to guarantee positions and dimensional accuracy of interlocking notches in the second stage, the honeycomb plates are cut by adopting a numerical control cutting mode.

The present disclosure has the beneficial effects that:

(1) A zero-Poisson-ratio honeycomb structure is provided by the present disclosure, which can effectively solve the problem that a saddle-shaped effect is likely to occur for the traditional honeycomb structure under the large curvature condition.

(2) The design of the mechanical properties of the zero-Poisson-ratio honeycomb structure is achieved by controlling geometrical parameters of the honeycomb structure.

(3) The zero-Poisson-ratio honeycomb structure in the present disclosure can guarantee that the structure has stable zero-Poisson-ratio characteristics when subjected to large strains.

(4) The zero-Poisson-ratio honeycomb structure provided in the present disclosure can be molded by using the resin matrix composites with an interlocking assembly process.

(5) The lay up design can be achieved by adopting the interlocking assembly process to prepare composites honeycomb structure in the present disclosure.

BRIEF DESCRIPTION OF THE DRAWINGS

FIG. 3(a) depicts the curve of in-plane Poisson's ratio v12 with different β parameters, and FIG. 3(b) depicts the curve of in-plane Poisson's ratio v12 with different γ parameters;

DETAILED DESCRIPTION OF THE EMBODIMENTS

The present disclosure is further described in detail below from a design point of view and a manufacturing process with reference to the accompanying drawings.

Figure 1:
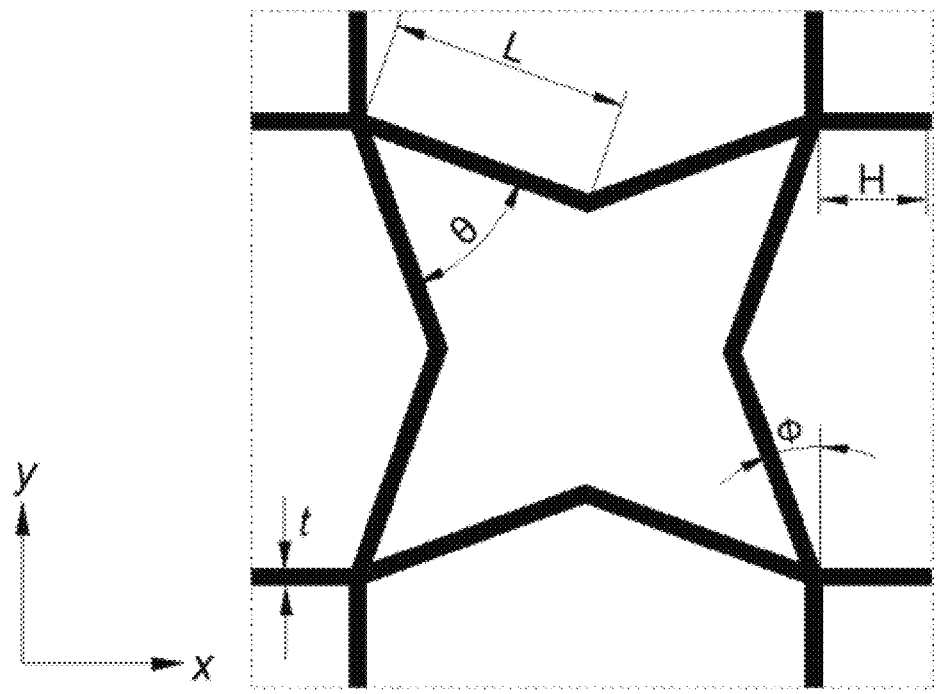
FIG. 1 is a schematic diagram illustrating a definition of geometric dimensions of a zero-Poisson-ratio honeycomb structure unit cell.
Figure 2:
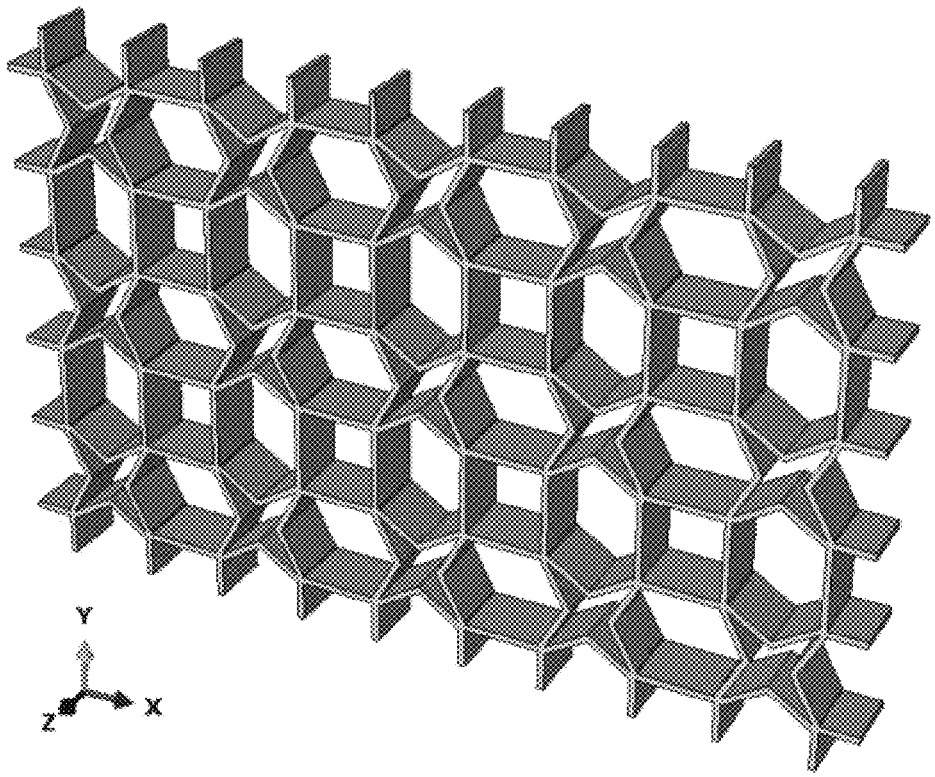
FIG. 2 is a schematic diagram of a zero-Poisson-ratio honeycomb structure.

In terms of the design point of view, a zero-Poisson-ratio honeycomb structure unit cell is shown in FIG. 1 The honeycomb structure unit cell is represented by the honeycomb inclined wall length L, the straight wall length H, the honeycomb wall angles θ and Φ, the honeycomb wall thickness t, and the honeycomb structure unit cell thickness b. To facilitate structure design and analysis, the dimensional parameters of the honeycomb unit cell are subjected to dimensionless processing. The dimensionless parameters α, β and γ are defined, wherein α is a length ratio of the honeycomb walls, β is a slope ratio of the honeycomb walls, and γ is a thickness ratio of the honeycomb walls. By periodically arranging the representative honeycomb structure unit cells in an x-y plane to form the zero-Poisson-ratio honeycomb structure, as shown in FIG. 2. The array distance is the width of the honeycomb structure unit cell, i.e., 2H+2L cos Φ.

Figure 3A:
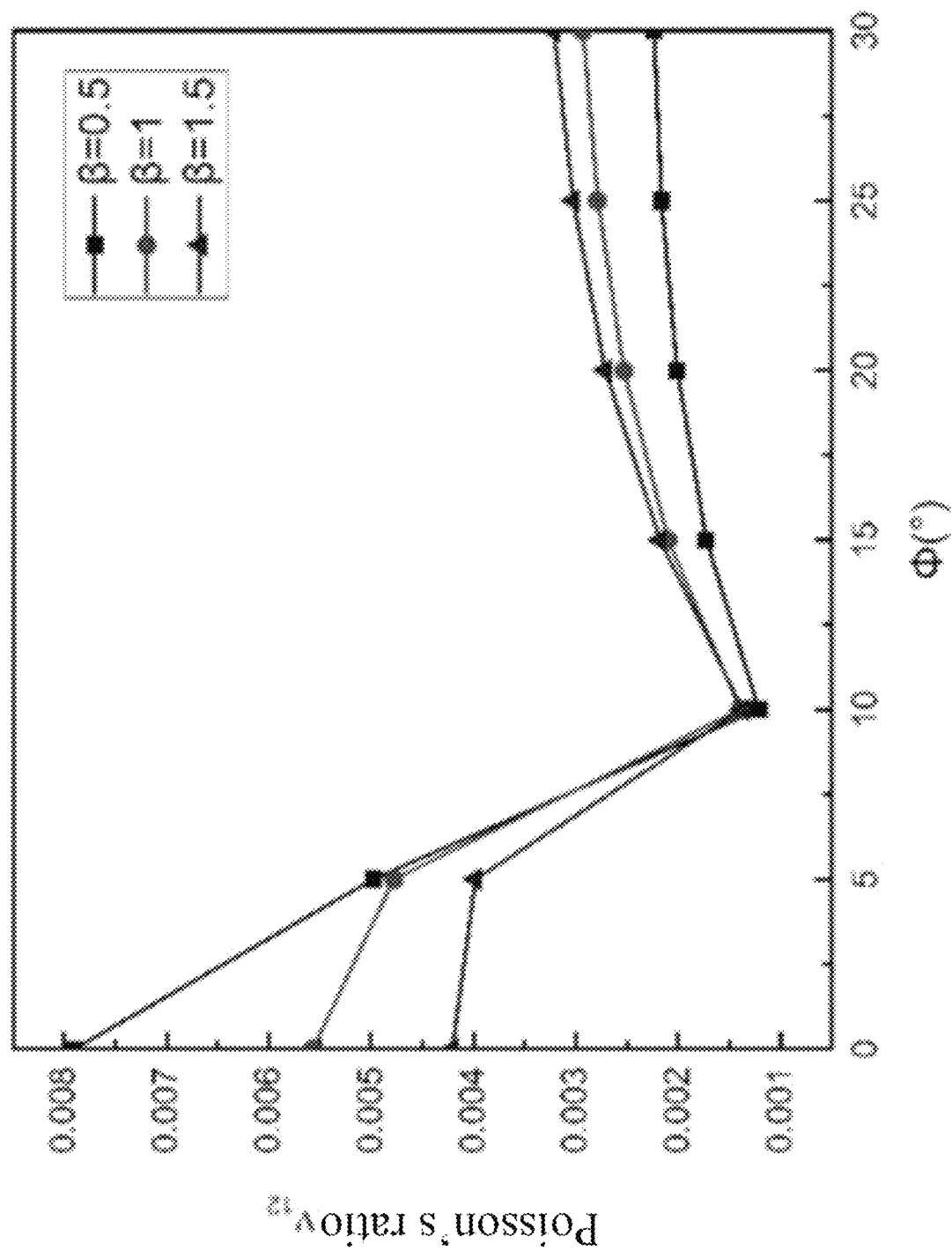
FIGS. 3(a) & 3(b) are schematic diagrams of in-plane Poisson' ratio v12 of the zero-Poisson-ratio honeycomb structure with different β and γ parameters; where
Figure 3B:
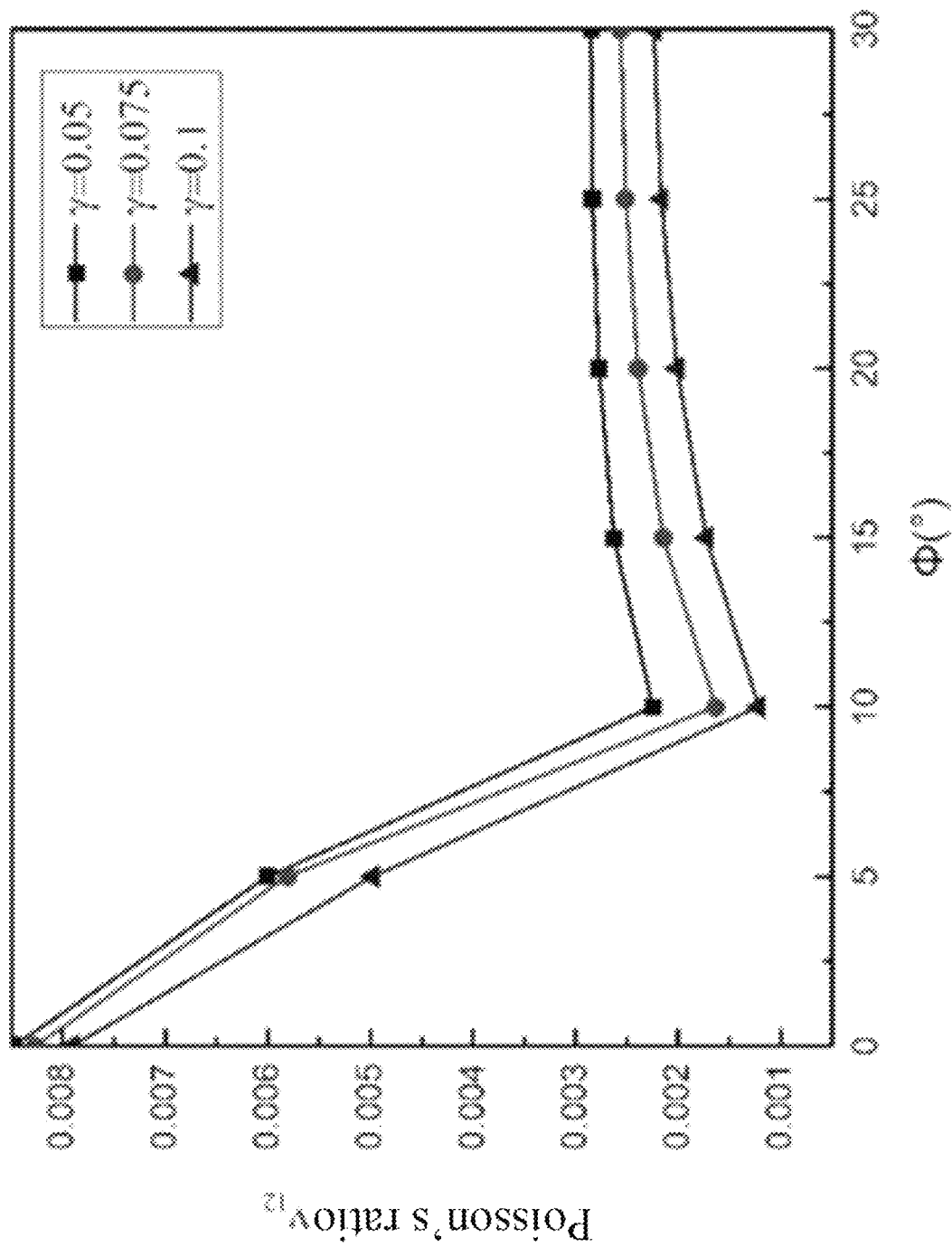

In accordance with a zero-Poisson-ratio honeycomb structure, the representative honeycomb structure unit cells are subjected to equivalent elastic modulus analysis by employing a representative volume element method in finite element method, with a computation result as shown in FIGS. 3(a) and 3(b). It can be known from the computation result that the in-plane Poisson's ratio of the honeycomb structure is stabilized around 0.002, and the honeycomb structure has the zero-Poisson-ratio characteristic.

Figure 4:
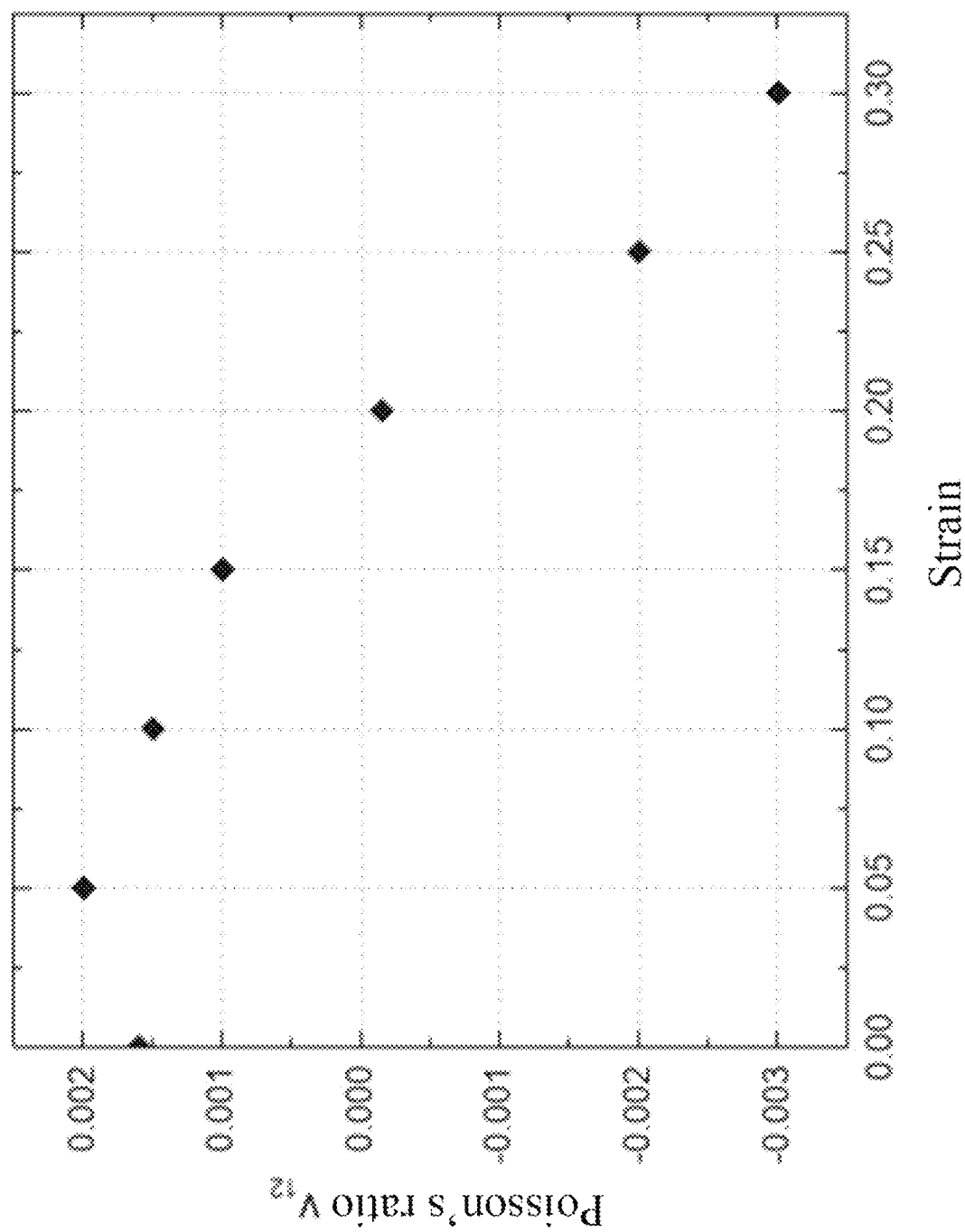
FIG. 4 is a diagram illustrating the stability of in-plane Poisson ratio v 12 of a zero-Poisson-ratio honeycomb structure.

In accordance with the zero-Poisson-ratio honeycomb structure, the change of the Poisson's ratio of the honeycomb structure under different strains is analyzed by utilizing the finite element method. It can be known from FIG. 4 that the zero-Poisson-ratio characteristic remains steady when the structure is subjected to large strains.

Figure 5:
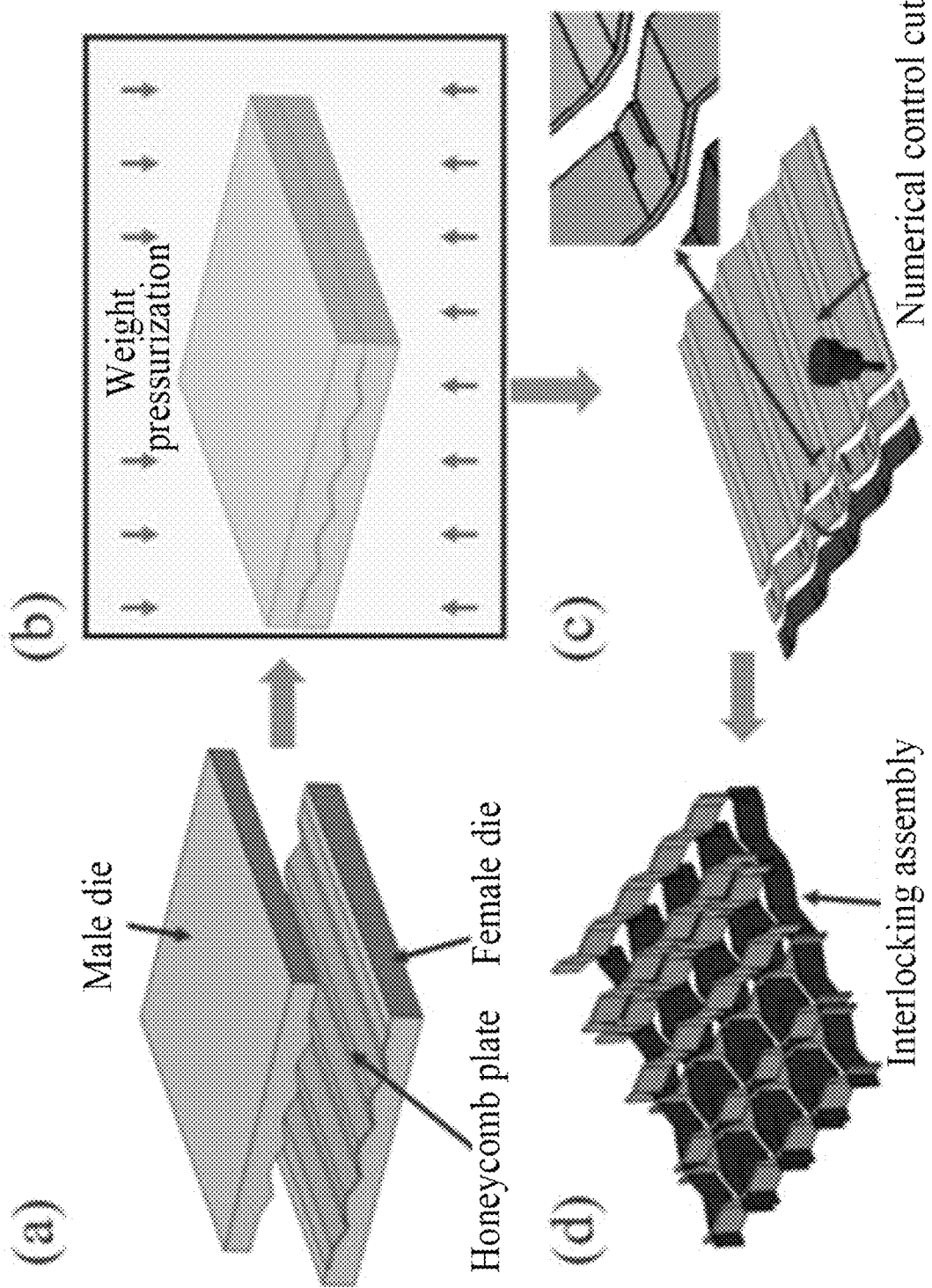
FIG. 5 is a flow diagram of an interlocking assembly process of the zero-Poisson-ratio honeycomb structure.

In terms of the manufacturing process, a zero-Poisson-ratio honeycomb structure can be prepared by combining resin matrix composites with an interlocking assembly process. The manufacturing process of the honeycomb structure is as shown in FIG. 5. The manufacturing process is generally divided into two stages. The first is the manufacturing of honeycomb plates by using a molding process of the resin matrix composites. The second is the procedures of cutting, interlocking and assembling on the molded honeycomb plates, with specific preparation flow as follows:

(1) a honeycomb plate mold is designed. A female die and a male die for the honeycomb plate are drawn according to pre-designed dimensional parameters such as the honeycomb inclined wall length L, the straight wall length H, and the honeycomb wall angle Φ. A gap between the female die and the male die is set as the honeycomb wall thickness t.

(2) Dimensions of the mold in the example are that honeycomb inclined wall length L=10 mm, the straight wall length H=5 mm, the honeycomb wall angle Φ=30°, and the honeycomb wall thickness t=0.75 mm. The honeycomb plate mold is as shown in FIG. 5(a).

(3) The composites honeycomb plates are prepared by adopting a mold-contact low-pressure molding process in the example, which are cured at normal temperature for 24 h, as shown in FIG. 5(b).

(4) After the composites honeycomb plates are molded, the composites honeycomb plates are cut into plurality of interlocking samples with equal widths b by using a numerical control cutting mode. The open slots with a depth of b/2 and a width of t are cut in the intersection of the horizontal wall and the inclined wall of the honeycomb structure along the width direction, as shown in FIG. 5(c).

(5) The upper open slots and the lower open slots are assembled into the zero-Poisson-ratio honeycomb structure in a mode of engaging and interlocking with each other, which is as shown in FIG. 5(d).

A zero-Poisson-ratio honeycomb structure is provided. Due to the characteristics of the honeycomb structure, the stable zero-Poisson-ratio characteristic is achieved, and a new mode is provided for the manufacturing process of the honeycomb structure. The honeycomb structure can be manufactured by combining an interlocking assembly process with resin matrix composites. The performance of the honeycomb structure is further improved at the material level.

For different loading conditions and service environments, the zero-Poisson-ratio honeycomb structure can be optimally designed by adjusting the parameters such as the side length, the included angle, and the wall thickness of the honeycomb structure unit cell, thus giving full play to the engineering application value of the structure. The honeycomb structure provided by the present disclosure has good designability, and an optimal configuration can be obtained by adjusting dimensional parameters according to actual needs.

For those of ordinary skill in the art to which the present disclosure belongs, various simple derivations and substitutions may also be made without departing from the premise of the conception of the present disclosure, all of which should be considered as the scope of patent protection determined by the submitted claims of the present disclosure.

What is claimed is:

1. A zero-Poisson-ratio honeycomb structure, which is formed by an array of representative honeycomb structure unit cells in an X direction and a Y direction in a two-dimensional Cartesian coordinate system, thus guaranteeing that the shapes of the representative honeycomb structure unit cells are unchanged, wherein the step size of the array is the unit cell width, which is $2H+2L\cos\Phi$;

the representative honeycomb structure unit cell includes the following geometrical parameters: an inclined wall length L, a straight wall length H, honeycomb wall angles $\theta$ and $\Phi$, the honeycomb wall thickness t, and the unit cell thickness b;

the representative honeycomb structure unit cell is in a centrosymmetric pattern which is composed of a four-pointed star shape and straight walls; in an XOY plane, the four-pointed star has a side length of L, and an inner angle of $\theta$; and at the star corners of two adjacent four-pointed stars, the centrosymmetric pattern is formed by connecting the X-direction and Y-direction straight walls with the length of H; the zero-Poisson-ratio honeycomb structure is formed by stretching the centrosymmetric pattern with a distance b along the Z direction.

* * * * *